US012656711B2

(12) United States Patent

Tsukada et al.

(10) Patent No.: US 12,656,711 B2

(45) Date of Patent: Jun. 16, 2026

(54) IMAGE FORMING APPARATUS

(71) Applicant: CANON KABUSHIKI KAISHA, Tokyo (JP)

(72) Inventors: Masaru Tsukada, Kanagawa (JP); Ken Yokoyama, Shizuoka (JP); Osamu Koyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 18/969,476

(22) Filed: Dec. 5, 2024

(65) Prior Publication Data

US 2025/0199441 A1 Jun. 19, 2025

(30) Foreign Application Priority Data

Dec. 15, 2023 (JP) ................................ 2023-212347

(51) Int. Cl.

*G03G 21/16* (2006.01)
*G03G 15/00* (2006.01)
*G03G 15/16* (2006.01)

(52) U.S. Cl.

CPC ..... *G03G 15/1615* (2013.01); *G03G 15/6558* (2013.01); *G03G 21/1638* (2013.01)

(58) Field of Classification Search

CPC ........... G03G 15/1615; G03G 15/6558; G03G 21/1633; G03G 21/1638

See application file for complete search history.

(56) References Cited

U.S. PATENT DOCUMENTS

2013/0051854 A1* 2/2013 Sakuma ............. G03G 15/1605 399/121
2014/0079434 A1* 3/2014 Sakashita ........... G03G 21/1633 399/121
2015/0346646 A1* 12/2015 Koshida ............ G03G 21/1633 399/121
2024/0411262 A1* 12/2024 Taniguchi .......... G03G 15/6558

FOREIGN PATENT DOCUMENTS

JP 2006011044 A 1/2006
JP 2011085867 A 4/2011
JP 2013114209 A 6/2013
JP 2015175952 A 10/2015

* cited by examiner

*Primary Examiner* — Thomas S Giampaolo, II

(74) *Attorney, Agent, or Firm* — ROSSI, KIMMS & McDOWELL LLP

(57) ABSTRACT

An image forming apparatus includes a belt member, a first transfer roller, a second transfer roller, a tension unit including a tension member, a guide member configured to move between a guide position and a path open position, an opening/closing member configured to move between a closed position and an open position, and a support member configured to move in conjunction with the opening/closing member and configured to support the guide member. The support member is configured to engage with the tension unit to position the guide member with respect to the tension member while positioning the guide member in the guide position in a case where the opening/closing member is positioned in the closed position, and the support member is configured to position the guide member in the path open position in a case where the opening/closing member is positioned in the open position.

17 Claims, 6 Drawing Sheets

IMAGE FORMING APPARATUS

BACKGROUND OF THE INVENTION

Field of the Invention

This disclosure relates to an image forming apparatus that forms an image on a sheet.

Description of the Related Art

According to Japanese Patent Laid-Open No. 2013-114209, an image forming apparatus including an intermediate transfer belt that is wound around by a drive roller, a secondary transfer counter roller, and a driven roller, and a lower conveyance guide and an upper conveyance guide that guide a recording material toward the intermediate transfer belt is proposed. The lower and upper conveyance guides are positioned and secured by a guide support member, and the guide support member is rotatably supported by a rotation shaft of the driven roller. Therefore, the guide support member moves in accordance with a position of the driven roller, and also the lower and upper conveyance guides, which are secured to the guide support member, move to follow the movement of the driven roller. Thereby, a positional relationship between the recording material entering a secondary transfer portion and the intermediate transfer belt is maintained, and image defects are suppressed.

However, both of the lower and upper conveyance guides described in Japanese Patent Laid-Open No. 2013-114209 are secured to the guide support member, and it is not possible to open a conveyance path formed by the lower and upper conveyance guides. Therefore, there are issues with jam handling performance.

SUMMARY OF THE INVENTION

According to one aspect of the present invention, an image forming apparatus includes a belt member, which is endless, configured to bear a toner image, a first transfer roller configured to come into contact with an inner circumferential surface of the belt member, a second transfer roller configured to form a transfer nip together with the first transfer roller via the belt member, the second transfer roller being configured to transfer the toner image on the belt member onto a sheet in the transfer nip while conveying the sheet in a sheet conveyance direction, a tension unit including a tension member that is arranged upstream of the transfer nip in the sheet conveyance direction and is configured to stretch the belt member by pressing the inner circumferential surface of the belt member, a guide member configured to guide the sheet and form a conveyance path through which the sheet passes, the guide member being configured to move between a guide position in which the guide member guides the sheet toward the transfer nip, and a path open position in which the guide member opens the conveyance path, an opening/closing member configured to move between a closed position and an open position, the opening/closing member being configured to open the conveyance path by moving from the closed position to the open position, and a support member configured to move in conjunction with the opening/closing member and configured to support the guide member. The support member is configured to engage with the tension unit to position the guide member with respect to the tension member while positioning the guide member in the guide position in a case where the opening/closing member is positioned in the closed position, and the support member is configured to position the guide member in the path open position in a case where the opening/closing member is positioned in the open position.

Further features of the present invention will become apparent from the following description of exemplary embodiments with reference to the attached drawings.

DESCRIPTION OF THE EMBODIMENTS

First Embodiment

Overall Configuration

Figure 1A:
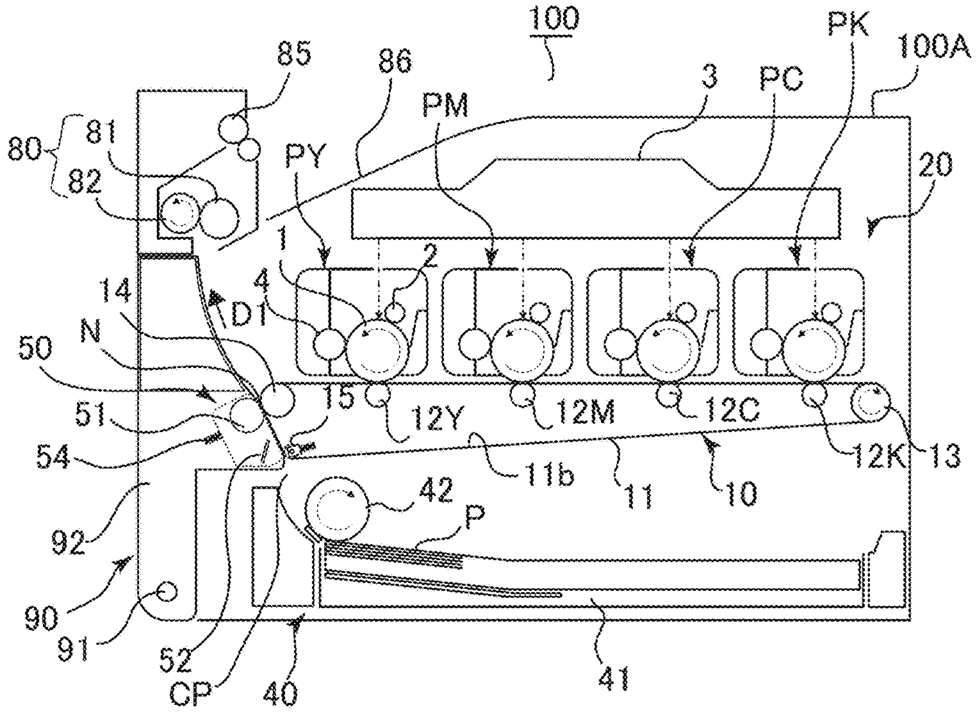
FIG. 1A is an overall schematic diagram illustrating an image forming apparatus in a state in which a door unit is closed.

First, a first embodiment of this disclosure will be described. FIG. 1A is an overall schematic diagram illustrating an image forming apparatus 100 in a state in which a door unit 90 is closed, and FIG. 1B is an overall schematic diagram illustrating the image forming apparatus 100 in a state in which the door unit 90 is opened.

Figure 1B:
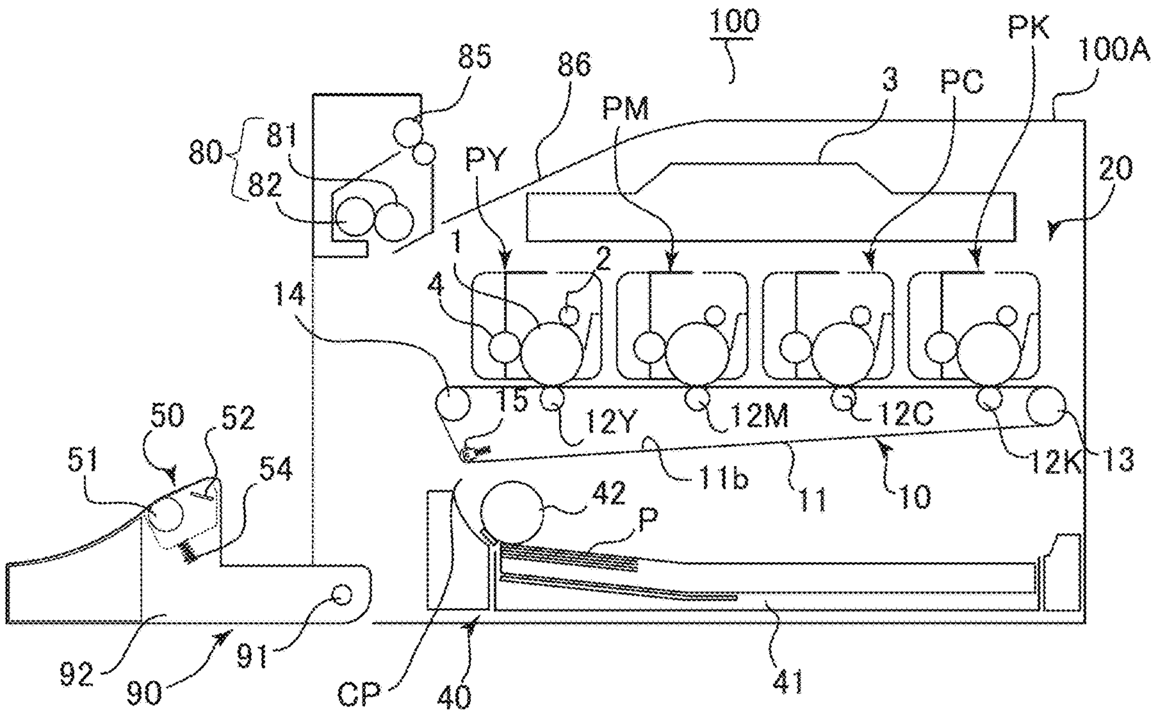
FIG. 1B is an overall schematic diagram illustrating the image forming apparatus in a state in which the door unit is opened.

As illustrated in FIGS. 1A and 1B, the image forming apparatus 100 is a laser beam printer of an electrophotographic system. To be noted, the image forming apparatus refers to apparatuses that include such as printers, copiers, facsimile machines, and multifunction machines and form an image on a sheet, which is used as a recording medium, based on image information input from an external personal computer (PC) or image information read from a document. Further, while, in addition to a main body which has an image forming function, sometimes, optional feeders, image reading apparatuses, sheet processing apparatuses and the likes are connected to the image forming apparatuses, the entire system to which these auxiliary devices are connected is also a type of the image forming apparatus.

The image forming apparatus 100 includes an image forming unit 20 that forms the image on the sheet P, a sheet feeding apparatus 40, a fixing unit 80, and a sheet discharge roller pair 85. The image forming unit 20 includes four process cartridges PY, PM, PC, and PK that respectively form toner images of four colors, which are yellow (Y), magenta (M), cyan (C), and black (K), an exposing unit 3, and an intermediate transfer apparatus 10.

To be noted, except for the color of the image that is formed, configurations of the four process cartridges PY, PM, PC, and PK are the same. Therefore, only the configuration and an image forming process of the process cartridge PY will be described, and descriptions of the process cartridges PM, PC, and PK will be omitted herein.

The process cartridge PY includes a photosensitive drum 1, a charge roller 2, and a developing roller 4. The photosensitive drum 1 is formed by applying an organic photoconductive layer onto an outer circumference of an aluminum cylinder, and is rotated by a drive motor, not shown.

The intermediate transfer apparatus 10 arranged under the four process cartridges PY, PM, PC, and PK includes an endless intermediate transfer belt 11. The intermediate transfer belt 11, serving as a belt member, is stretched by a drive roller 13, a secondary transfer counter roller 14, and a tension roller 15, and is rotated by the drive roller 13. That is, the drive roller 13, the secondary transfer counter roller 14, and the tension roller 15 come into contact with an inner circumferential surface 11*b* of the intermediate transfer belt 11. Further, primary transfer rollers 12Y, 12M, 12C, and 12K are disposed inside of the intermediate transfer belt 11. A secondary transfer roller 51, serving as a second transfer roller, is arranged on a side opposite to the secondary transfer counter roller 14, serving as a first transfer roller, across the intermediate transfer belt 11. The secondary transfer roller 51 forms a transfer nip N together with the secondary transfer counter roller 14 via the intermediate transfer belt 11.

The fixing unit 80 includes a fixing film 81 that is heated by a heater and a pressing roller 82 that comes into pressure contact with the fixing film 81. The sheet feeding apparatus 40 is disposed at a lower section of the image forming apparatus 100, and includes a cassette 41 storing the sheet P and a feed roller 42.

The image forming apparatus 100 includes an apparatus body 100A storing the process cartridges PY, PM, PC, and PK and a door unit 90 openably supported by the apparatus body 100A. The door unit 90 includes a door 92 pivotable around a pivot shaft 91 as a center and a secondary transfer apparatus 50 supported with some allowance by the door 92, serving as an opening/closing member. In other words, the door unit 90 and the door 92 are openably supported between a closed position and an open position with respect to the apparatus body 100A, and are moved to the open position when opening a conveyance path CP, described below.

The secondary transfer apparatus 50 includes the secondary transfer roller 51, an urging member 54 urging the secondary transfer roller 51 toward the secondary transfer counter roller 14, and a conveyance guide 52. The urging member 54 is constituted by, for example, a spring such as a compression spring, but it is not limited to springs and can be other elastic members such as rubber or sponge. The conveyance guide 52 is movable to a guide position (refer to FIG. 1A) where the conveyance guide 52 guides the sheet toward the transfer nip and forms the conveyance path CP, through which the sheet P passes, together with the intermediate transfer belt 11, and a path open position (refer to FIG. 1B) where the conveyance guide 52 guides opens the conveyance path CP. That is, the conveyance guide 52, serving as a guide member, is positioned in the guide position when the door 92 is positioned in the closed position, and is positioned in the path open position when the door 92 is positioned in the open position. In addition, when the door 92 is positioned in the closed position, the secondary transfer roller 51 is urged toward the secondary transfer counter roller 14 by the urging member 54, and is positioned with respect to the secondary transfer counter roller 14. Next, an image forming operation of the image forming apparatus 100 that is configured as described above will be described. When the image information is input from such as a PC, not shown, to the exposing unit 3, laser light corresponding to an image signal is irradiated onto the photosensitive drum 1 of the process cartridge PY from the exposing unit 3.

At this time, a surface of the photosensitive drum 1 has been uniformly charged to a predetermined polarity and electrical potential beforehand, and, by irradiating with the laser light from the exposing unit 3, an electrostatic latent image is formed on the surface. The electrostatic latent image formed on the photosensitive drum 1 is developed by the developing roller 4, and the toner image of yellow (Y) is formed on the photosensitive drum 1.

Similarly, the laser light is also irradiated from the exposing unit 3 to respective photosensitive drums of the process cartridges PM, PC, and PK, and the toner images of magenta (M), cyan (C), and black (K) are formed on the respective photosensitive drums. The toner image of each color formed on the respective photosensitive drums is transferred onto the intermediate transfer belt 11 by the primary transfer rollers 12Y, 12M, 12C, and 12K, and is conveyed to the transfer nip N by being borne by the intermediate transfer belt 11 that is rotated by the drive roller 13. To be noted, the image forming process of each color is performed at the timing at which the toner image is superimposed onto the upstream toner image that has been primarily transferred onto the intermediate transfer belt 11.

In parallel with this image forming process, the sheet P stored in the sheet feeding apparatus 40 is sent by the feed roller 42, serving as a feed unit. Then, the sheet P fed by the feed roller 42 and passing through the conveyance path CP is guided to the transfer nip N by the conveyance guide 52. The conveyance guide 52 can come into contact with a second surface (non-printing surface) of the sheet P, which is opposite to a first surface (printing surface) onto which the toner image is transferred by the transfer nip N. By a secondary transfer bias applied to the secondary transfer roller 51, the toner image of full color on the intermediate transfer belt 11 is transferred onto the sheet P at the transfer nip N. That is, the toner image on the intermediate transfer belt 11 is transferred onto the sheet P at the transfer nip N with the sheet P conveyed in a sheet conveyance direction D1.

By the fixing film 81 and the pressing roller 82 of the fixing unit 80, predetermined heat and pressure are applied to the sheet P onto which the toner image has been transferred, and the toner is melted and bonded (fixed). The sheet P passed through the fixing unit 80 is discharged to a sheet discharge tray 86 by the sheet discharge roller pair 85.

To be noted, while the image forming apparatus 100 of the present embodiment is configured to print only on one side of the sheet P, it is not limited to this. For example, the image forming apparatus 100 may include a duplex conveyance path that guides the sheet P to the transfer nip N again while reversing the sheet P after the toner image has been formed on the first surface of the sheet P. As described above, the image forming apparatus 100 may be configured to form the toner image on both the first and second surfaces of the sheet P.

Engagement Unit

Figure 2:
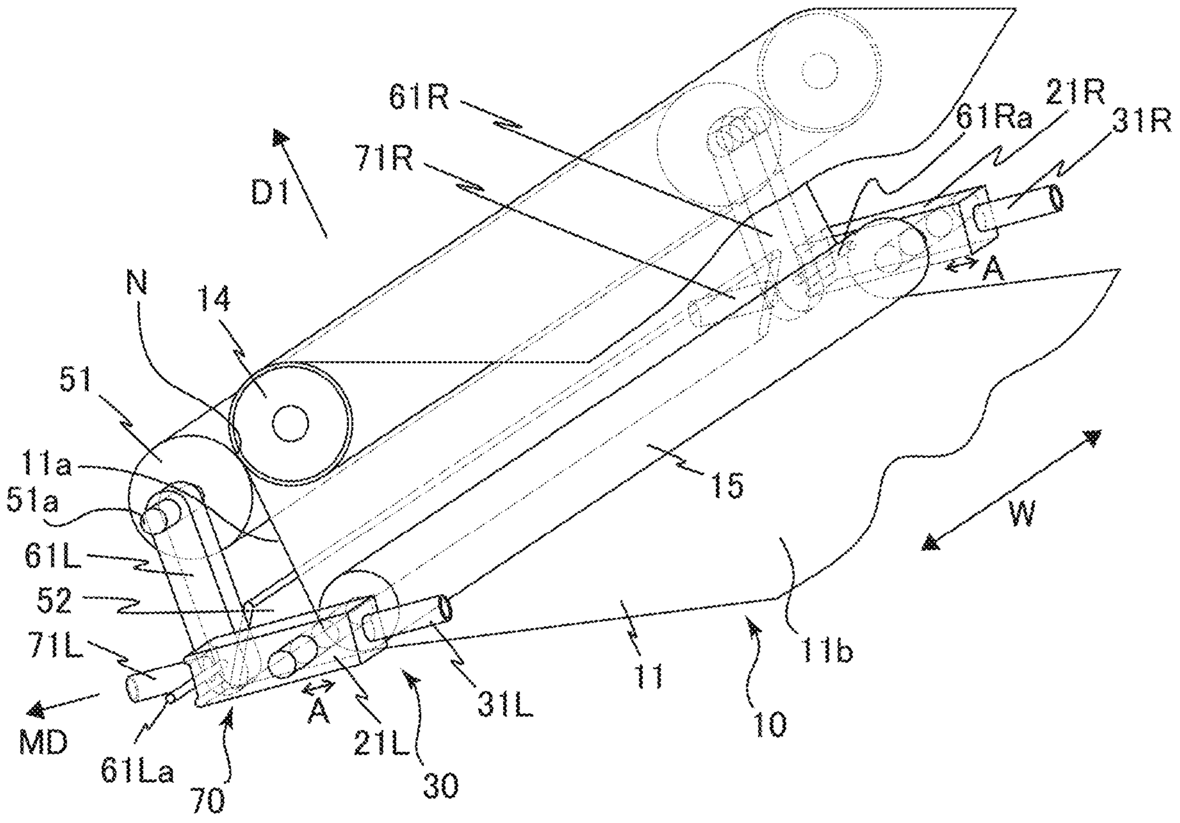
FIG. 2 is a perspective view illustrating an engagement unit according to a first embodiment.
Figure 3A:
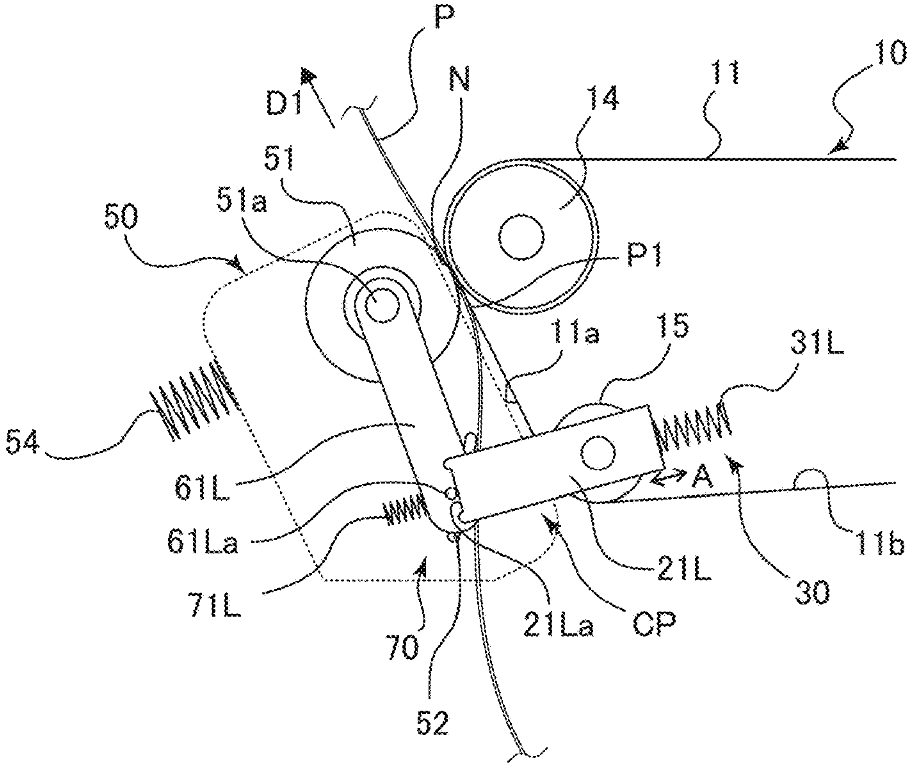
FIG. 3A is a side view illustrating the engagement unit when a door is positioned in a closed position.
Figure 3B:
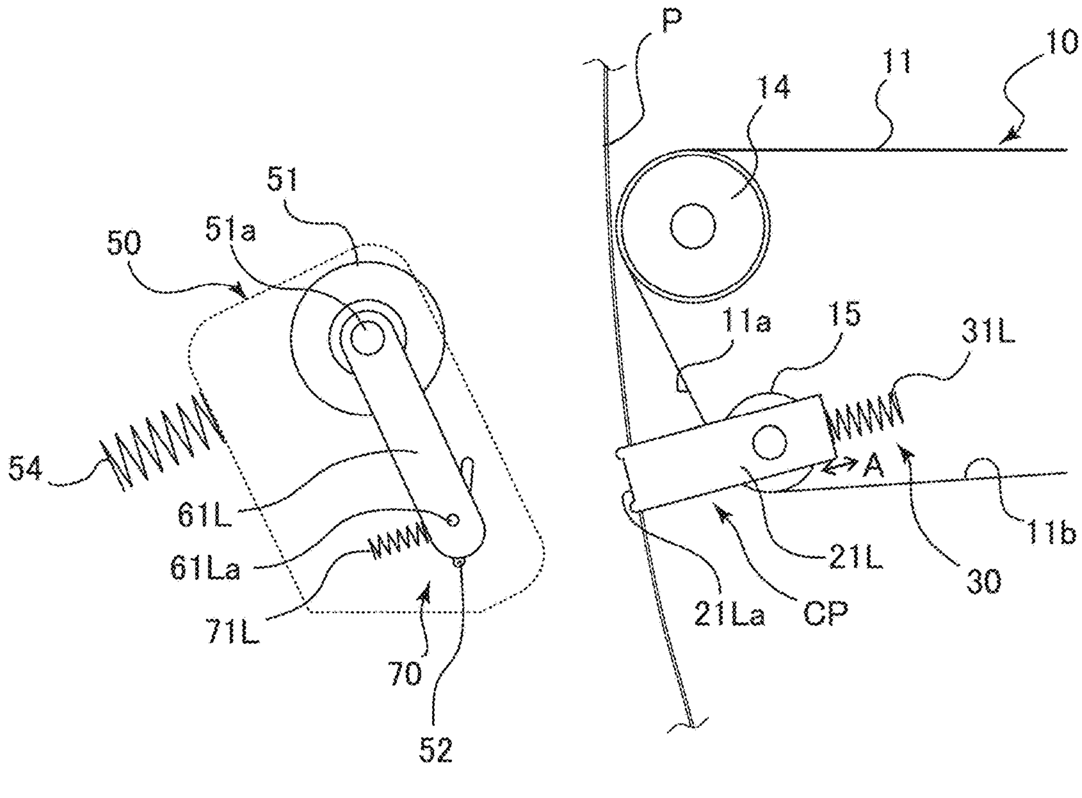
FIG. 3B is a side view illustrating the engagement unit when the door is positioned in an open position.

Next, using FIGS. 2 to 3B, an engagement unit 70 will be described. FIG. 2 is a perspective view illustrating the engagement unit 70 according to a first embodiment. FIG. 3A is a side view illustrating the engagement unit 70 when the door 92 is positioned in the closed position. FIG. 3B is a side view illustrating the engagement unit 70 when the door 92 is positioned in the open position.

As illustrated in FIG. 2, the engagement unit 70 includes first support members 21L and 21R, urging members 31L and 31R, second support members 61L and 61R, and urging members 71L and 71R. These members are disposed to be arranged laterally in pairs in a width direction W, which is orthogonal to the sheet conveyance direction D1, and subscripts "L" and "R" attached to reference numerals indicate whether they are positioned on one side or the other in the width direction W. In addition, these paired members have the same configuration, so that only one of the pair may be described when relevant and, at times, a description of the other will be omitted.

The first support members 21L and 21R are supported by a frame, not shown, of the intermediate transfer apparatus 10 in a manner movable in an arrow A direction, and rotatably support both end portions of the tension roller 15. The tension roller 15, serving as a tension member, is arranged upstream of the transfer nip N in the sheet conveyance direction D1. The urging members 31L and 31R respectively urge the first support members 21L and 21R such that the tension roller 15 is urged toward the inner circumferential surface 11*b* of the intermediate transfer belt 11. These tension roller 15, first support members 21L and 21R, and urging members 31L and 31R constitute a tension unit 30.

With this configuration, the tension roller 15 applies a predetermined tensile force to the intermediate transfer belt 11, and a position of the tension roller 15 is determined by balance between urging forces of the urging members 31L and 31R and the tensile force of the intermediate transfer belt 11. In addition, when the position of the tension roller 15 is determined, a position of a surface 11*a* of the intermediate transfer belt 11 stretched between the secondary transfer counter roller 14 and the tension roller 15 is determined.

The second support members 61L and 61R are pivotably supported by both end portions of a rotation shaft 51*a* of the secondary transfer roller 51, and are urged toward the tension roller 15 and the first support members 21L and 21R by the urging members 71L and 71R. That is, the second support members 61L and 61R are interlocked with the door 92 that supports the secondary transfer apparatus 50. In other words, the second support members 61L and 61R are pivotably supported by the door 92. Both end portions of the conveyance guide 52 in the width direction W are supported by the second support members 61L and 61R. While the urging members 31L, 31R, 71L, and 71R are constituted by a spring such as, for example, a compression spring, it is not limited to springs, and can be other elastic members such as the rubber or the sponge.

The first support members 21L and 21R include abutment surfaces 21La and 21Ra, and these abutment surfaces 21La and 21Ra extend in a direction intersecting a movement direction MD in which the door 92 moves from the closed position to the open position. In addition, the second support members 61L and 61R include bosses 61La and 61Ra that can come into contact with and be separated from the abutment surfaces 21La and 21Ra. The bosses 61La and 61Ra extend in the width direction W.

Next, while an operation of the engagement unit 70 will be described using FIGS. 3A and 3B, only one side (a side with the subscript "L") of the engagement unit 70 will be described, and a description of the other side (a side with the subscript "R") will be omitted. As illustrated in FIG. 3A, when the door 92 is positioned in the closed position, the boss 61La abuts against the abutment surface 21La At this time, since the second support member 61L is urged by the urging member 71L, serving as a first urging member, the boss 61La is pressed against the abutment surface 21La.

That is, the first and second support members 21L and 61L are engaged with each other at the boss 61La and the abutment surface 21La. Therefore, the conveyance guide 52 supported by the second support member 61L, serving as a support member, is positioned with respect to the tension roller 15 supported by the first support member 21L, serving as an engaged member.

Since a position of the boss 61La follows a positional change of the first support member 21L in the arrow A direction, even when the position of the tension roller 15 changes, a relative position of the conveyance guide 52 with respect to the tension roller 15 remains almost unchanged. Therefore, a positional relationship between the surface 11*a* of the intermediate transfer belt 11, which moves to follow the tension roller 15, and the sheet P whose non-printing surface side is guided by the conveyance guide 52 is maintained.

As described above, when the door 92 is positioned in the closed position as illustrated in FIG. 3A, the first and second support members 21L and 61L engage. With this configuration, the conveyance guide 52 is positioned with respect to the tension roller 15 so as to be positioned in the guide position in which the conveyance path CP is formed together with the surface 11*a* of the intermediate transfer belt 11. Therefore, it is possible to reduce a positional shift of a contact position P1 where the sheet P guided by the conveyance guide 52 begins to come into contact with the surface 11*a* of the intermediate transfer belt 11.

As a result, it is possible to suppress the occurrence of image defects at a position upstream of the transfer nip N in the sheet conveyance direction D1. For example, in a case where the contact position P1 is positioned too close to the transfer nip N to fall within a region where an electric field for secondary transfer is strong, there is a risk that the toner image borne on the intermediate transfer belt 11 will become disrupted due to an electric discharge occurring between the intermediate transfer belt 11 and the sheet P. In addition, in a case where the contact position P1 is too far from the transfer nip N and extends a distance in which the sheet P and the intermediate transfer belt 11 rub against each other, there is a risk that the image defects will occur due to vibrations and friction generated by the rubbing between the sheet P and the intermediate transfer belt 11. Since, in the present embodiment, the conveyance guide 52 is positioned with respect to the tension roller 15, it is possible to stably maintain the contact position P1 within a predetermined proper distance from the transfer nip N, and it is possible to suppress the image defects as described above.

In addition, while the urging members 31L and 71L respectively urge the first and second support members 21L and 61L in directions opposite to each other, the urging force of the urging member 71L is set to be smaller than the urging force of the urging member 31L. Therefore, the tension roller 15 can press the inner circumferential surface 11*b* of the intermediate transfer belt 11 without difficulty. In addition, the urging forces of the urging members 31L and 71L are set such that, even if the sheet P with relatively high rigidity, such as thick paper, comes into contact with the conveyance guide 52, the conveyance guide 52 does not move due to a reaction force from the sheet P.

Next, when, as illustrated in FIG. 3B, the door 92 is positioned in the open position, the boss 61La is being separated from the abutment surface 21La. That is, the tension unit 30 including the first support member 21L and the second support member 61L are separated from each other, and the positioning of the conveyance guide 52 with respect to the tension roller 15 is released.

Then, the conveyance guide 52 moves along with the door 92 and the second support member 61L, and is positioned in the path open position to open the conveyance path CP. In other words, the conveyance guide 52 is movable to the guide position (a position of FIG. 3A) forming the conveyance path CP and the path open position (a position of FIG. 3B) to open the conveyance path CP, and, by moving the door 92 from the closed position to the open position, moves from the guide position to the path open position. With this configuration, it is possible to easily handle the sheet jammed in the conveyance path CP, and it is possible to improve jam handling performance.

As described above, in the present embodiment, when the door 92 is positioned in the closed position, it is possible to position the conveyance guide 52 in the guide position with respect to the tension roller 15, and it is possible to suppress the image defects. In addition, when the door 92 is positioned in the open position, the conveyance guide 52 moves along with the door 92 to open the conveyance path CP, and it is possible to improve the jam handling performance. In addition, since the abutment surface 21La of the first support member 21L extends in a direction substantially orthogonal to the arrow A direction, it is possible to maintain an engagement relationship between the boss 61La, which pivots around the rotation shaft 51*a* as a center, and the abutment surface 21La, which moves linearly in the arrow A direction, with a simple configuration.

To be noted, while, in the present embodiment, the abutment surface 21La, serving as a surface, is disposed on the first support member 21L and the boss 61La, serving as an abutment portion, is disposed on the second support member 61L, it is not limited to this. For example, the boss 61La may be disposed on the first support member 21L, and the abutment surface 21La may be disposed on the second support member 61L. In addition, the abutment surface 21La may be disposed on the rotation shaft or the like of the tension roller 15. That is, the abutment surface 21La may be disposed on either one of the tension unit 30 or the second support member 61L, and the boss 61La may be disposed on the other of the tension unit 30 or the second support member 61L.

Second Embodiment

Figure 4A:
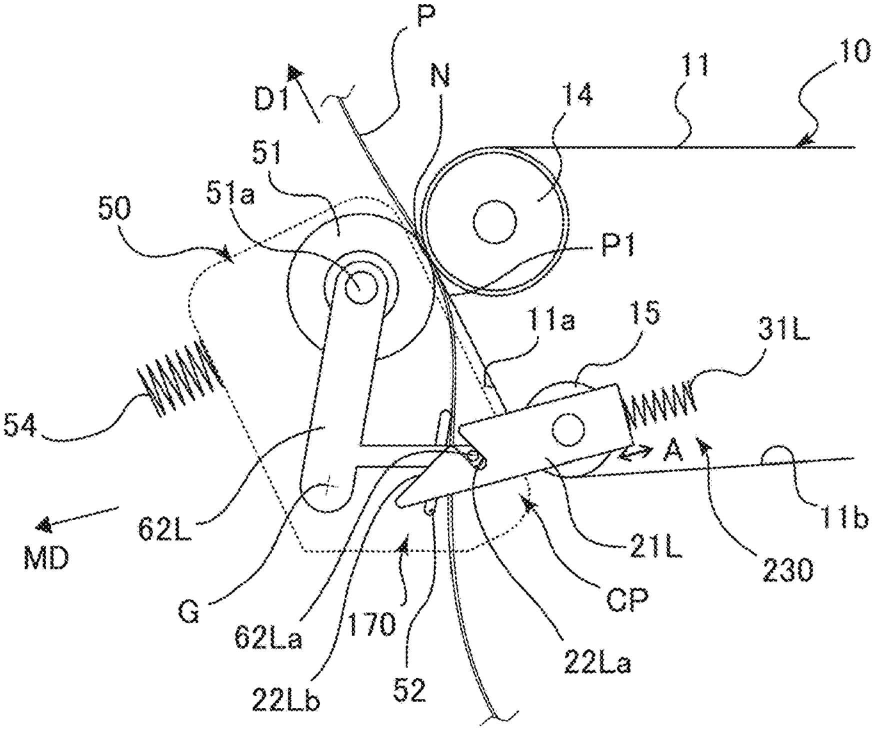
FIG. 4A is a side view illustrating an engagement unit according to a second embodiment when the door is positioned in the closed position.
Figure 4B:
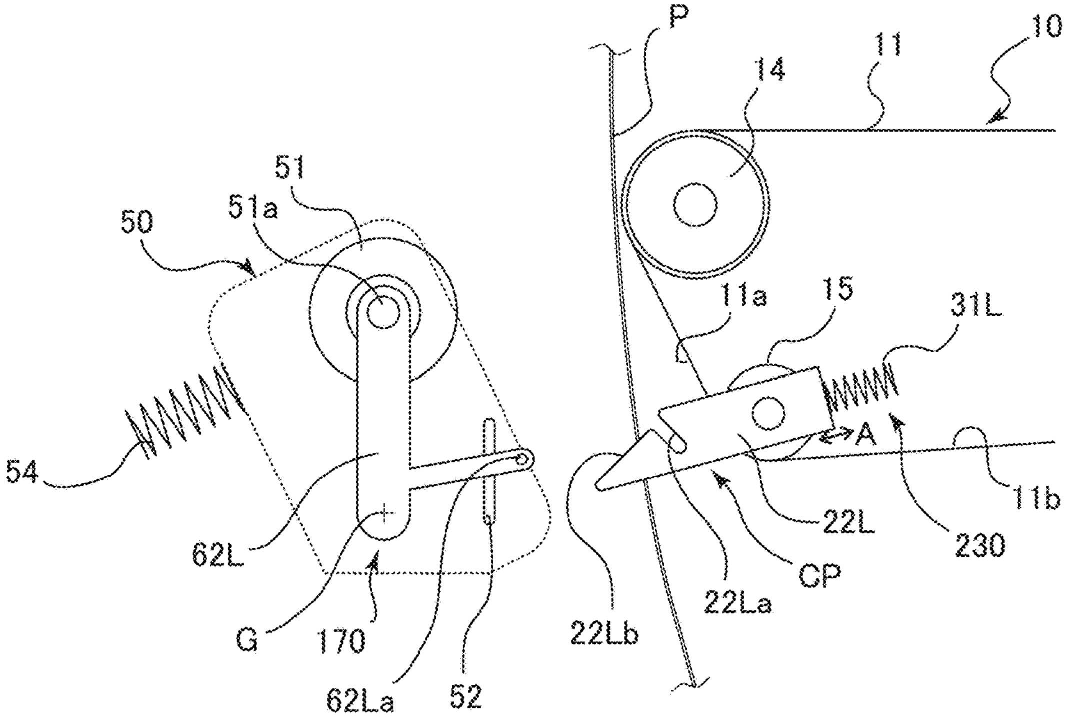
FIG. 4B is a side view illustrating the engagement unit when the door is positioned in the open position.

Next, while a second embodiment of this disclosure will be described, in the second embodiment, the configuration of the engagement unit 70 of the first embodiment is changed. Therefore, configurations similar to the first embodiment will be described by omitting illustrations or by putting the same reference characters on drawings. FIG. 4A is a side view illustrating an engagement unit 170 according to the second embodiment when the door 92 is positioned in the closed position, and FIG. 4B is a side view illustrating the engagement unit 170 when the door 92 is positioned in the open position.

As illustrated in FIG. 4A, the engagement unit 170 according to the second embodiment includes a first support member 22L, a second support member 62L, and the urging member 31L. To be noted, similar to the first embodiment, while the first support member 22L, the second support member 62L, and the urging member 31L are disposed to be arranged laterally in pairs in the width direction W, only one side in the width direction W will be described.

The first support member 22L, serving as the engaged member, is supported by the frame, not shown, of the intermediate transfer apparatus 10 in a manner movable in the arrow A direction, and rotatably supports the tension roller 15. The urging member 31L urges the first support member 22L to urge the tension roller 15 toward the inner circumferential surface 11*b* of the intermediate transfer belt 11. With this configuration, the tension roller 15 applies a predetermined tensile force to the intermediate transfer belt 11, and the position of the tension roller 15 is determined by balance between the urging force of the urging member 31L and the tensile force of the intermediate transfer belt 11. These tension roller 15, first support member 22L, and urging member 31L constitute a tension unit 230.

The second support member 62L is pivotably supported by the rotation shaft 51*a* of the secondary transfer roller 51, and is not urged by an urging member as in the first embodiment. The conveyance guide 52 is supported by the second support member 62L.

The first support member 22L includes a groove 22La formed to have one side open. The groove 22La extends in a direction intersecting the movement direction MD in which the door 92 moves from the closed position to the open position. The movement direction MD also intersects the arrow A direction which is a movement direction of the first support member 22L. In addition, the second support member 62L includes a boss 62La that can engage with and disengage from the groove 22La. The boss 62La extends in the width direction W.

Next, an operation of the engagement unit 170 will be described. As illustrated in FIG. 4A, when the door 92 is positioned in the closed position, the boss 62La engages with the groove 22La. At this time, since the groove 22La extends in the direction intersecting the arrow A direction and the movement direction MD, the first and second support members 22L and 62L are in an interlocked relationship. That is, the first and second support members 22L and 62L engage with each other at the boss 62La and the groove 22La. Therefore, the conveyance guide 52 supported by the second support member 62L is positioned in the guide position with respect to the tension roller 15 supported by the first support member 22L.

Since a position of the boss 62La follows a positional change of the first support member 22L supporting the tension roller 15 in the arrow A direction, even when the position of the tension roller 15 changes, the relative position of the conveyance guide 52 with respect to the tension roller 15 remains almost unchanged. Therefore, the positional relationship between the surface 11*a* of the intermediate transfer belt 11, which moves to follow the tension roller 15, and the sheet P whose non-printing surface side is guided by the conveyance guide 52 is maintained. Therefore, it is possible to reduce the positional shift of the contact position P1 where the sheet P guided by the conveyance guide 52 begins to come into contact with the surface 11*a* of the intermediate transfer belt 11.

Next, when, as illustrated in FIG. 4B, the door 92 is moved from the closed position to the open position, the second support member 62L pivots around the rotation shaft 51*a* as a center, and the boss 62La retreats from the groove 22La. When engagement between the boss 62La and the groove 22La is released, the second support member 62L is maintained in a posture in which the center of gravity G of the second support member 62L and the rotation shaft 51*a* are aligned vertically in a straight line. Then, when the door 92 is positioned in the open position, the boss 62La is separated from the groove 22La. That is, the tension unit 230 including the first support member 22L and the second support member 62L are separated from each other, and the positioning of the conveyance guide 52 with respect to the tension roller 15 is released.

Then, the conveyance guide 52 moves along with the door 92 and the second support member 62L, and is positioned in the path open position to open the conveyance path CP. Thereby, it is possible to easily handle the sheet jammed in the conveyance path CP, and it is possible to improve the jam handling performance.

To be noted, when the door 92 is closed from the open position to the closed position again, the boss 62La of the second support member 62L is guided toward the groove 22La by a guide surface 22Lb of the first support member 22L. Then, the second support member 62 pivots around the rotation shaft 51*a*, and the boss 62La engages with the groove 22La.

As described above, also in the second embodiment, similar to the first embodiment, it is possible to achieve both the suppression of the image defects and the improvement of the jam handling performance. In addition, since it is possible to eliminate an urging member for urging the second support member 62L, a cost reduction can be achieved.

To be noted, while, in the present embodiment, the groove 22La is disposed in the first support member 22L and the boss 62La, serving as an engagement portion, is disposed on the second support member 62L, it is not limited to this. For example, the boss 62La may be disposed on the first support member 22L, and the groove 22La may be disposed in the second support member 62L. In addition, the groove 22La may be disposed in the rotation shaft or the like of the tension roller 15. That is, it is acceptable if the groove 22La is disposed in either one of the tension unit 230 or the second support member 62L while the boss 62La is disposed on the other of the tension unit 230 or the second support member 62L.

Third Embodiment

Figure 5A:
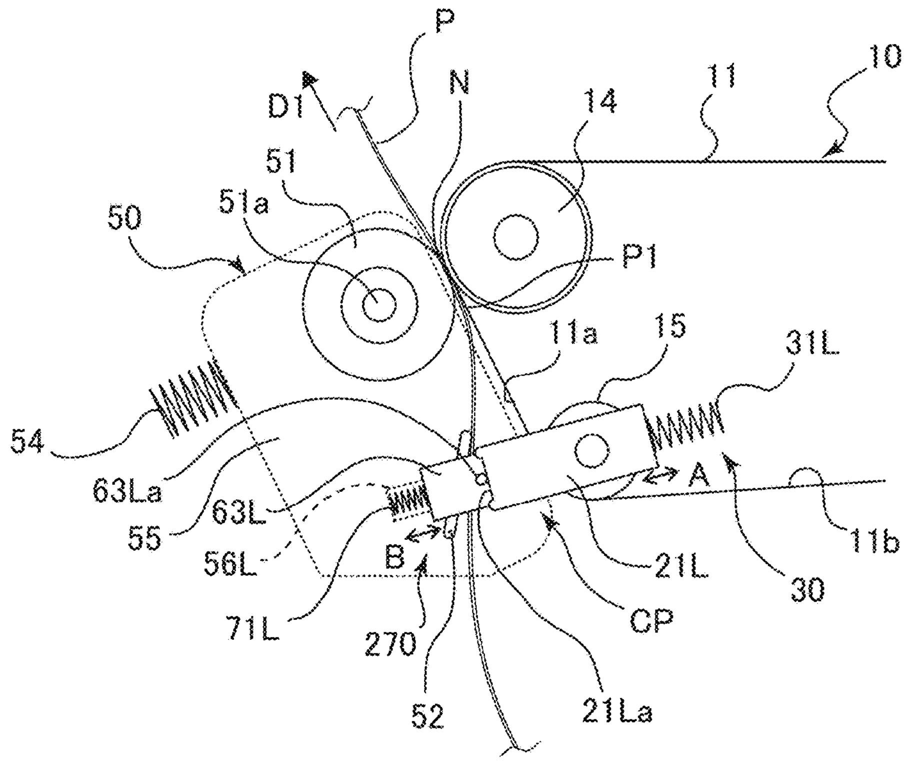
FIG. 5A is a side view illustrating an engagement unit according to a third embodiment when the door is positioned in the closed position.
Figure 5B:
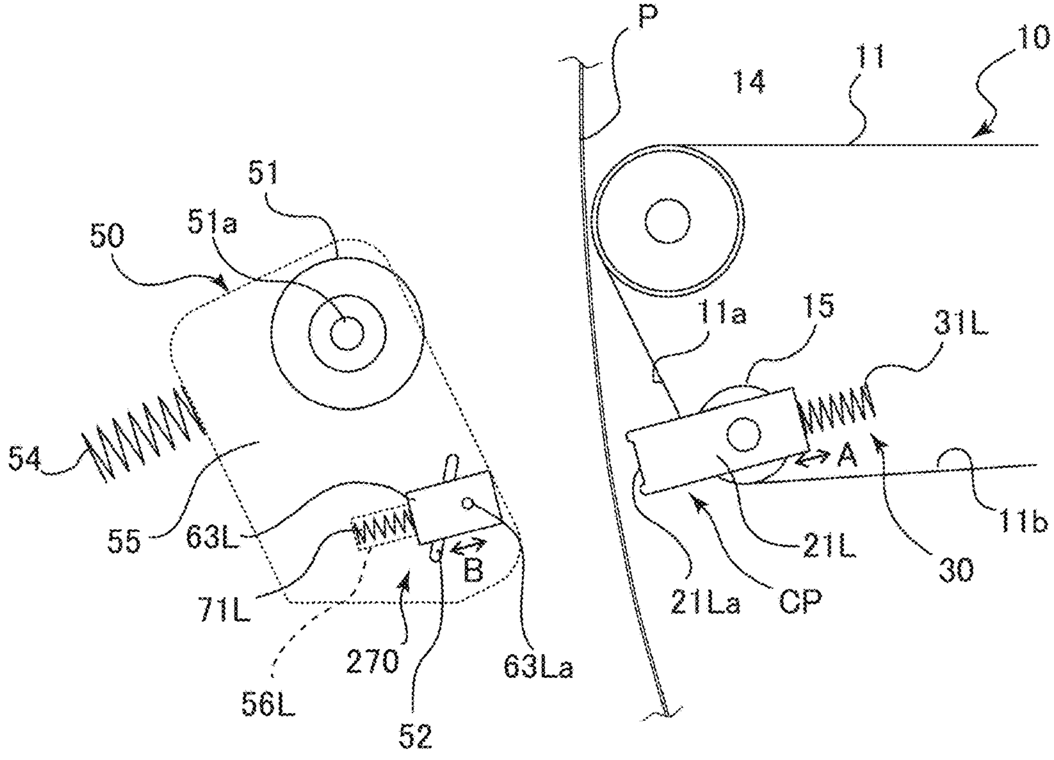
FIG. 5B is a side view illustrating the engagement unit when the door is positioned in the open position.

Next, while a third embodiment of this disclosure will be described, in the third embodiment, the configuration of the engagement unit 70 of the first embodiment is changed. Therefore, configurations similar to the first embodiment will be described by omitting illustrations or by putting the same reference characters on drawings. FIG. 5A is a side view illustrating an engagement unit 270 according to the third embodiment when the door 92 is positioned in the closed position, and FIG. 5B is a side view illustrating the engagement unit 270 when the door 92 is positioned in the open position.

As illustrated in FIG. 5A, the engagement unit 270 according to the third embodiment includes the first support member 21L, a second support member 63L, and the urging members 31L and 71L. To be noted, while, similar to the first embodiment, the first support member 21L, the second support member 63L, and the urging members 31L and 71L are disposed to be arranged laterally in pairs in the width direction W, only one side in the width direction W will be described. In this embodiment, with respect to the first embodiment, especially, a configuration and a function of the second support member 63L are different.

The second support member 63L, serving as the support member, is supported by a frame 55 of the secondary transfer apparatus 50 in a manner slidingly movable in an arrow B direction, and is urged toward the tension roller 15 and the first support member 21L by the urging member 71L. In other words, the second support member 63L is slidingly movably supported by the door 92. The conveyance guide 52 is supported by the second support member 63L. The second support member 63L includes a boss 63La that can come into contact with and be separated from the abutment surface 21La of the first support member 21L. The boss 63La extends in the width direction W. To be noted, the arrow B direction is a direction that, in a state in which the door 92 is positioned in the closed position, is substantially the same as the arrow A direction which is a linear motion direction of the first support member 21L.

Next, an operation of the engagement unit 270 will be described. As illustrated in FIG. 5A, when the door 92 is positioned in the closed position, the boss 63La comes into contact with the abutment surface 21La. At this time, by the second support member 63L being urged by the urging member 71L, the boss 63La is pressed against the abutment surface 21La.

That is, the first and second support members 21L and 63L engage with each other at the boss 63La and the abutment surface 21La. Therefore, the conveyance guide 52 supported by the second support member 63L is positioned with respect to the tension roller 15 supported by the first support member 21L.

Since a position of the boss 63La follows the positional change of the first support member 21L supporting the tension roller 15 in the arrow A direction, even when the position of the tension roller 15 changes, the relative position of the conveyance guide 52 with respect to the tension roller 15 remains unchanged. Therefore, the positional relationship between the surface 11*a* of the intermediate transfer belt 11, which moves to follow the tension roller 15, and the sheet P whose non-printing surface side is guided by the conveyance guide 52 is maintained. Therefore, it is possible to reduce the positional shift of the contact position P1 where the sheet P guided by the conveyance guide 52 begins to come into contact with the surface 11*a* of the intermediate transfer belt 11.

Next, when moving the door 92 from the closed position to the open position as illustrated in FIG. 5B, the boss 63La is separated from the abutment surface 21La after the urging members 31L and 71L have returned to their natural states. That is, the tension unit 30 including the first support member 21L and the second support member 63L are separated from each other, and the positioning of the conveyance guide 52 with respect to the tension roller 15 is released.

Then, the conveyance guide 52 moves along with the door 92 and the second support member 63L, and is positioned in the path open position to open the conveyance path CP. Thereby, it is possible to easily handle the sheet P jammed in the conveyance path CP, and it is possible to improve the jam handling performance.

As described above, also in the third embodiment, similar to the first embodiment, it is possible to achieve both the suppression of the image defects and the improvement of the jam handling performance. In addition, since, when the door 92 is positioned in the closed position, the arrow B direction that is a linear motion direction of the conveyance guide 52 is substantially the same as the arrow A direction that is a linear motion direction of the tension roller 15, it is possible to accurately position the conveyance guide 52 with respect to the tension roller 15.

Fourth Embodiment

Figure 6A:
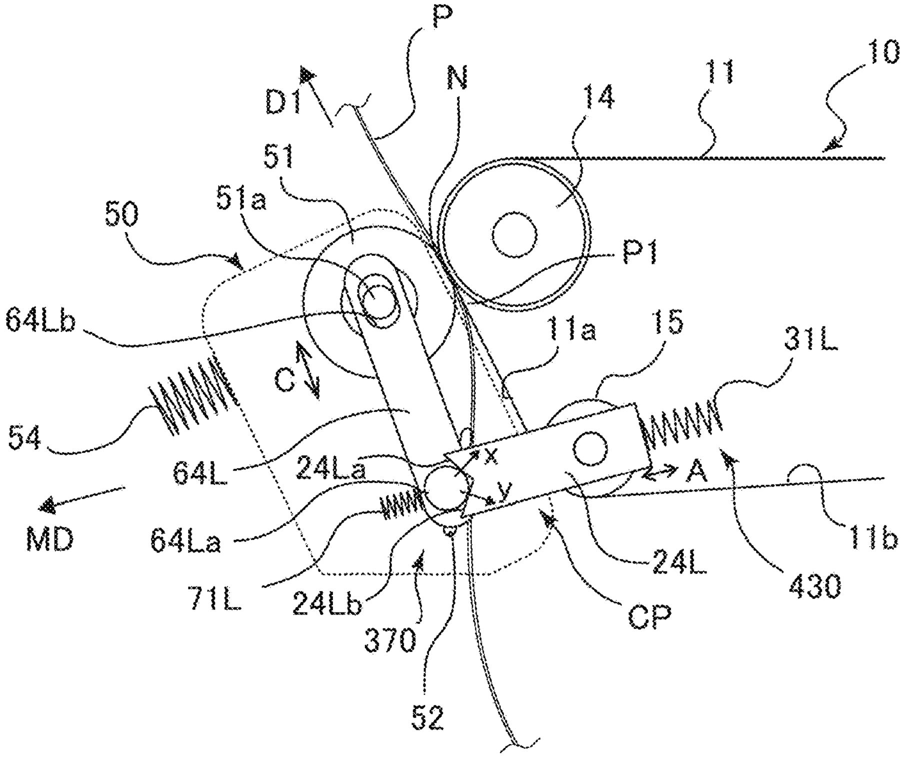
FIG. 6A is a side view illustrating an engagement unit according to a fourth embodiment when the door is positioned in the closed position.
Figure 6B:
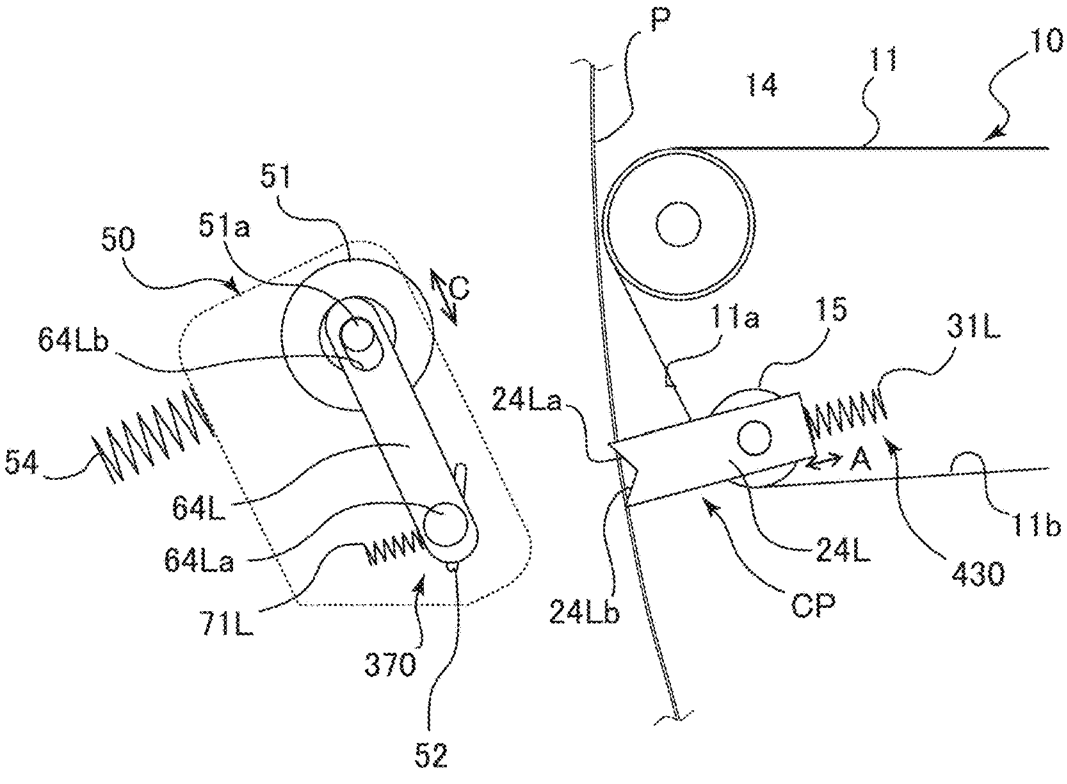
FIG. 6B is a side view illustrating the engagement unit when the door is positioned in the open position.

Next, while a fourth embodiment of this disclosure will be described, in the fourth embodiment, the configuration of the engagement unit 70 of the first embodiment is changed. Therefore, configurations similar to the first embodiment will be described by omitting illustrations or by putting the same reference characters on drawings. FIG. 6A is a side view illustrating an engagement unit 370 according to the fourth embodiment when the door 92 is positioned in the closed position, and FIG. 6B is a side view illustrating the engagement unit 370 when the door 92 is positioned in the open position.

As illustrated in FIG. 6A, the engagement unit 370 according to the fourth embodiment includes a first support member 24L, a second support member 64L, and the urging members 31L and 71L. To be noted, while, similar to the first embodiment, the first support member 24L, the second support member 64L, and the urging members 31L and 71L are disposed to be arranged laterally in pairs in the width direction W, only one side in the width direction W will be described.

The first support members 24L, serving as the engaged member, is supported by the frame, not shown, of the intermediate transfer apparatus 10 in a manner movable in the arrow A direction, and rotatably supports the tension roller 15. The urging member 31L urges the first support member 24L to urge the tension roller 15 toward the inner circumferential surface 11*b* of the intermediate transfer belt 11. With this configuration, the tension roller 15 applies the predetermined tensile force to the intermediate transfer belt 11, and the position of the tension roller 15 is determined by the balance between the urging force of the urging member 31L and the tensile force of the intermediate transfer belt 11. These tension roller 15, first support members 24L, and urging member 31L constitute a tension unit 430.

The second support member 64L, serving as the support member, is pivotably supported by the rotation shaft 51*a* of the secondary transfer roller 51, and is urged toward the tension roller 15 and the first support member 24L by the urging member 71L. In addition, the second support member 64L includes an elongated hole 64Lb extending in an arrow C direction, and the rotation shaft 51*a* is inserted into the elongated hole 64Lb. That is, the second support member 64L is movable with respect to the rotation shaft 51*a* in the arrow C direction within a range of the elongated hole 64Lb. The conveyance guide 52 is supported by the second support member 64L.

The first support member 24L includes a first contact surface 24La extending in a first direction (a direction orthogonal to an arrow x direction) intersecting the movement direction MD, which is a direction in which the second support member 64L moves when the door 92 moves from the closed position to the open position, and a second contact surface 24Lb. The second contact surface 24Lb extends in a second direction (a direction orthogonal to an arrow y direction) intersecting both of the movement direction MD and the first direction described above. In addition, the second support member 64L includes a boss 64La that can come into contact with and be separated from the first and second contact surfaces 24La and 24Lb. The boss 64La extends in the width direction W, serving as a sheet width direction, and, when viewed in the width direction, the conveyance guide 52 is arranged to overlap the boss 64La.

Next, an operation of the engagement unit 370 will be described. As illustrated in FIG. 6A, when the door 92 is positioned in the closed position, the boss 64La engages with the first and second contact surfaces 24La and 24Lb of the first support member 24L. At this time, since the second support member 64L is urged by the urging member 71L, the boss 64La is pressed against the first and second contact surfaces 24La and 24Lb respectively in the arrow x and y directions.

That is, the boss 64La of the second support member 64L is positioned with respect to the first and second contact surfaces 24La and 24Lb of the first support member 24L, and the conveyance guide 52 supported by the second support member 64L is positioned with respect to the tension roller 15. Since a position of the boss 64La follows a positional change of the first support member 24L supporting the tension roller 15 in the arrow A direction, even when the position of the tension roller 15 changes, the relative position of the conveyance guide 52 with respect to the tension roller 15 remains unchanged.

Especially, in the present embodiment, the second support member 64L is movable in the arrow C direction, and the movement of the boss 64La, which moves to follow the first and second contact surfaces 24La and 24Lb, in the arrow C direction is absorbed by the elongated hole 64Lb. Then, since the conveyance guide 52 is arranged to overlap the boss 64*a* when viewed in the width direction W, it is possible to accurately position the conveyance guide 52 with respect to the tension roller 15. Therefore, the positional relationship between the surface 11*a* of the intermediate transfer belt 11, which moves to follow the tension roller 15, and the non-printing surface side of the sheet P guided by the conveyance guide 52 is maintained. Therefore, it is possible to reduce the positional shift of the contact position P1 where the sheet P guided by the conveyance guide 52 begins to come into contact with the surface 11*a* of the intermediate transfer belt 11.

Next, when the door 92 is moved from the closed position to the open position as illustrated in FIG. 6B, the boss 64La is separated from the first and second contact surfaces 24La and 24Lb after the urging members 31L and 71L have returned to their natural states. That is, the tension unit 430 including the first support member 24L and the second support member 64L are separated from each other, and the positioning of the conveyance guide 52 with respect to the tension roller 15 is released.

Then, the conveyance guide 52 moves along with the door 92 and the second support member 64L, and is positioned in the path open position to open the conveyance path CP. Thereby, it is possible to easily handle the sheet jammed in the conveyance path CP, and it is possible to improve the jam handling performance.

As described above, also in the fourth embodiment, similar to the first embodiment, it is possible to achieve both the suppression of the image defects and the improvement of the jam handling performance. In addition, when the door 92 is positioned in the closed position, the boss 64La of the second support member 64L supporting the conveyance guide 52 is positioned in two directions that are intersected each other by the first and second contact surfaces 24La and 24Lb. Therefore, it is possible to accurately position the conveyance guide 52 with respect to the tension roller 15.

To be noted, while, in the present embodiment, the first and second contact surfaces 24La and 24Lb are disposed on the first support member 24L and the boss 64La, serving as a boss portion, is disposed on the second support member 64L, it is not limited to this. For example, the boss 64La may be disposed on the first support member 24L, and the first and second contact surfaces 24La and 24Lb may be disposed on the second support member 64L. In addition, the first and second contact surfaces 24La and 24Lb may be disposed on the rotation shaft or the like of the tension roller 15. That is, it is acceptable if the first and second contact surfaces 24La and 24Lb are disposed on either one of the tension unit 430 or the second support member 64L while the boss 64La is disposed on the other of the tension unit 430 or the second support member 64L.

Other Embodiments

To be noted, while, in any of the embodiments described above, the conveyance guide 52 is held by the secondary transfer apparatus 50, it is not limited to this. For example, the conveyance guide 52 may be held by a member such as the door 92, which moves integrally with the door unit 90, other than the secondary transfer apparatus 50.

In addition, the conveyance guide 52 may be held not by the door 92 but by the apparatus body 100A. In this case, the conveyance guide 52 is movably supported by a frame, not shown, or the like of the apparatus body 100A and includes an engagement portion, and the engagement portion is engaged with the tension roller 15 when the door 92 moves from the open position to the closed position. Therefore, the conveyance guide 52 is positioned with respect to the tension roller 15. On the other hand, it is acceptable to configure such that, when the door 92 moves from the closed position to the open position, the engagement portion is separated from the tension roller 15 and the conveyance guide 52 moves to the path open position.

In addition, while, in any of the embodiments described above, the conveyance guide 52 moves between the guide position and the path open position in conjunction with the opening/closing of the door 92, which constitutes part of an exterior surface of the image forming apparatus 100, it is not limited to this. For example, it is acceptable that there is another opening/closing member between the door 92 and the apparatus body 100A and the conveyance guide 52 moves between the guide position and the path open position in conjunction with an opening/closing of such an opening/closing member.

In addition, while, in any of the embodiments described above, the conveyance guide 52 forms the conveyance path CP with the surface 11*a* of the intermediate transfer belt 11 in the guide position, it is not limited to this. For example, the conveyance guide 52 may form the conveyance path CP with other guide members arranged between the conveyance guide 52 and the surface 1*a* of the intermediate transfer belt 11 in the guide position. At this time, it is preferable that the other guide members are, in conjunction with the conveyance guide 52, positioned with respect to the tension roller 15 when the door 92 is positioned in the closed position. In addition, when the door 92 is positioned in the open position, the positioning of the other guide members with respect to the tension roller 15 may either be released or maintained as long as the conveyance path CP is opened.

In addition, while, in any of the embodiments described above, the tension roller is a roller that is rotatably driven by the intermediate transfer belt 11, it is not limited to this. For example, instead of the tension roller 15, a non-rotating member that presses against the inner circumferential surface 11*b* of the intermediate transfer belt 11 may be used.

In addition, while, in any of the embodiments described above, the second support member (61L, 62L, 63L, or 64L) is separated from the first support member (21L, 22L, or 24L) when the door 92 is positioned in the open position, it is not limited to this. For example, the second support member may engage with the first support member when the door 92 is positioned in the open position.

In addition, while, in any of the embodiments described above, the second support member (61L, 62L, 63L, or 64L) is disposed independently from the conveyance guide 52, it is not limited to this. For example, the second support member and the conveyance guide 52 may be formed integrally.

In addition, the first to fourth embodiments described above may be freely combined. For example, in the second embodiment, it is acceptable to dispose the urging member 71L that urges the second support member 62L toward the tension roller 15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-212347, filed Dec. 15, 2023, which is hereby incorporated by reference herein in its entirety.

What is claimed is:

1. An image forming apparatus comprising:

a belt member, which is endless, configured to bear a toner image;

a first transfer roller configured to come into contact with an inner circumferential surface of the belt member;

a second transfer roller configured to form a transfer nip together with the first transfer roller via the belt member, the second transfer roller being configured to transfer the toner image on the belt member onto a sheet in the transfer nip while conveying the sheet in a sheet conveyance direction;

a tension unit including a tension member that is arranged upstream of the transfer nip in the sheet conveyance direction and is configured to stretch the belt member by pressing the inner circumferential surface of the belt member;

a guide member configured to guide the sheet and form a conveyance path through which the sheet passes, the guide member being configured to move between a guide position in which the guide member guides the sheet toward the transfer nip, and a path open position in which the guide member opens the conveyance path;

an opening/closing member configured to move between a closed position and an open position, the opening/closing member being configured to open the conveyance path by moving from the closed position to the open position; and a support member configured to move in conjunction with the opening/closing member and configured to support the guide member, wherein the support member is configured to engage with the tension unit to position the guide member with respect to the tension member while positioning the guide member in the guide position in a case where the opening/closing member is positioned in the closed position, and the support member is configured to position the guide member in the path open position in a case where the opening/closing member is positioned in the open position.

2. The image forming apparatus according to claim 1, wherein the support member is configured to be separated from the tension unit in a case where the opening/closing member is positioned in the open position.

3. The image forming apparatus according to claim 1, further comprising a first urging member configured to urge the support member toward the tension unit.

4. The image forming apparatus according to claim 3, wherein the tension unit includes:

an engaged member configured to support the tension member and engage with the support member; and a second urging member configured to urge the engaged member toward the support member such that the tension member presses the inner circumferential surface of the belt member.

5. The image forming apparatus according to claim 4, wherein an urging force of the second urging member is larger than an urging force of the first urging member.

6. The image forming apparatus according to claim 1, wherein either one of the tension unit or the support member includes a surface that extends in a direction intersecting a movement direction in which the support member moves when the opening/closing member moves from the closed position to the open position, and wherein the other of the tension unit or the support member includes an abutment portion that is configured to abut against the surface when the opening/closing member is positioned in the closed position.

7. The image forming apparatus according to claim 1, wherein either one of the tension unit or the support member includes a groove that extends in a direction intersecting a movement direction in which the support member moves when the opening/closing member moves from the closed position to the open position, and wherein the other of the tension unit or the support member includes an engagement portion configured to engage with the groove when the opening/closing member is positioned in the closed position.

8. The image forming apparatus according to claim 7, wherein either one of the tension unit or the support member includes a guide surface configured to guide the engagement portion toward the groove when the opening/closing member moves from the open position to the closed position.

9. The image forming apparatus according to claim 1, wherein either one of the tension unit or the support member includes a first contact surface extending in a first direction and a second contact surface extending in a second direction, the first direction intersecting a movement direction in which the support member moves when the opening/closing member moves from the closed position to the open position, the second direction intersecting the movement direction and the first direction, and wherein the other of the tension unit or the support member includes a boss portion configured to come into contact with the first contact surface and the second contact surface when the opening/closing member is positioned in the closed position.

10. The image forming apparatus according to claim 9, wherein when viewed in a width direction orthogonal to the sheet conveyance direction, the guide member is arranged to overlap the boss portion in a case where the opening/closing member is positioned in the closed position.

11. The image forming apparatus according to claim 1, wherein the support member is pivotably supported by the opening/closing member.

12. The image forming apparatus according to claim 1, wherein the support member is slidingly movably supported by the opening/closing member.

13. The image forming apparatus according to claim 1, wherein the opening/closing member is configured to rotatably support the second transfer roller.

14. The image forming apparatus according to claim 1, wherein the opening/closing member is a door configured to form a part of an exterior surface of the image forming apparatus in the closed position.

15. The image forming apparatus according to claim 1, wherein the tension member is a roller rotatably supported by the tension unit.

16. The image forming apparatus according to claim 1, wherein the guide member is configured to form the conveyance path together with the belt member in the guide position.

17. The image forming apparatus according to claim 1, wherein the guide member is configured to come into contact with a second surface, of the sheet, opposite to a first surface onto which the toner image is transferred by the transfer nip.

* * * * *